UNITED STATES PATENT OFFICE.

WILLIAM BOCCHETTI, OF BROOKLYN, NEW YORK.

SILVER-SOLDER.

1,375,552.  Specification of Letters Patent.  Patented Apr. 19, 1921.

No Drawing.  Application filed February 10, 1920.  Serial No. 357,726.

*To all whom it may concern:*

Be it known that I, WILLIAM BOCCHETTI, a citizen of the United States, and a resident of the city of New York, borough of Brooklyn, county of Kings, and State of New York, have invented a new and improved Silver-Solder, of which the following is a full, clear, and exact description.

This invention relates to a composition for use in the soldering of silver, and has for an object, the provision of a solder with a low melting point which can be used at a temperature which will not melt silver.

I have found that solders commonly used for soldering silver have such a high melting point that when fine silverware is placed in a furnace and heated to a temperature sufficient for soldering, that the silverware is softened so that it is distorted or warped by the heat. By the use of my improved solder, a much lower temperature is needed for the soldering process so that the silverware is not distorted and warped. Furthermore the time necessary in carrying out the soldering process is considerably reduced since the sliverware is brought up to the required heat more quickly.

My improved composition is composed of the following ingredients substantially in the proportions named:

Silver _____ 59.5%
Copper _____ 25.5%
Zinc _____ 15.0%

To each ounce of the above composition, 1 gram of arsenic trioxid is added. These ingredients are melted together and are mixed by stirring. The arsenic trioxid is a flux which causes the solder to adhere to the silver with a greater tenacity. Other suitable fluxing agents may be used. I have found that the proportions of the above ingredients may be varied somewhat with more or less successful results.

I have found that my improved silver solder has all the good properties inherent in other silver solders now in use with the added quality of having a very low melting point which makes it unnecessary to use a high temperature in the furnace thus avoiding the warping and distortion of the silverware.

Having thus described my invention, I claim as new and desire to secure by Letters Patent:

1. A silver solder containing silver 55 to 65%, copper 20 to 30%, zinc 10 to 20%, and arsenic trioxid.

2. A silver solder containing silver, copper, zinc, and an arsenic compound.

3. A silver solder containing silver, copper, zinc, and arsenic trioxid.

4. A silver solder containing silver, copper, zinc, and arsenic trioxid, substantially in the proportions specified.

WILLIAM BOCCHETTI.